(12) United States Patent
Chen et al.

(10) Patent No.: US 9,996,191 B2
(45) Date of Patent: Jun. 12, 2018

(54) PANEL

(71) Applicant: AU Optronics Corporation, Hsin-Chu (TW)

(72) Inventors: Chi-Cheng Chen, Hsin-Chu (TW); Gui-Wen Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days. days.

(21) Appl. No.: 15/392,354

(22) Filed: Dec. 28, 2016

(65) Prior Publication Data

US 2017/0371477 A1 Dec. 28, 2017

(30) Foreign Application Priority Data

Jun. 27, 2016 (TW) .............................. 105120199 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04105* (2013.01)

(58) Field of Classification Search
CPC .............................. G06F 3/0414; G06F 3/0412
See application file for complete search history.

(56) References Cited

U.S. PATENT DOCUMENTS

| | | | |
|---|---|---|---|
| 9,116,569 B2 | 8/2015 | Stacy et al. | |
| 9,690,397 B2 * | 6/2017 | Shepelev | ............ G06F 3/03545 |
| 2010/0258346 A1 * | 10/2010 | Chen | ............ H01L 21/56 |
| | | | 174/521 |
| 2013/0257785 A1 * | 10/2013 | Brown | ............ G06F 3/044 |
| | | | 345/174 |
| 2014/0253499 A1 | 9/2014 | Lee et al. | |
| 2015/0338937 A1 * | 11/2015 | Shepelev | ............ G06F 3/044 |
| | | | 345/179 |
| 2015/0346839 A1 * | 12/2015 | Kawaguchi | ............ G06F 3/0202 |
| | | | 345/168 |
| 2016/0062537 A1 * | 3/2016 | Kim | ............ G06F 3/0416 |
| | | | 345/174 |
| 2016/0195957 A1 * | 7/2016 | Reynolds | ............ G06F 3/044 |
| | | | 345/174 |
| 2016/0195988 A1 * | 7/2016 | Fu | ............ G06F 3/044 |
| | | | 345/174 |
| 2016/0334917 A1 * | 11/2016 | Shepelev | ............ G06F 3/0416 |
| 2016/0349872 A1 * | 12/2016 | Hargreaves | ............ G06F 3/044 |

(Continued)

FOREIGN PATENT DOCUMENTS

| | | | |
|---|---|---|---|
| CN | 104571768 A | 4/2015 | |
| CN | 106020557 A | * 10/2016 | ........... G06F 3/0416 |
| TW | 201608447 A | 3/2016 | |

OTHER PUBLICATIONS

Taiwan Intellectual Property Office, "Office Action", dated Feb. 18, 2017.

*Primary Examiner* — Priyank Shah
(74) *Attorney, Agent, or Firm* — WPAT, PC

(57) ABSTRACT

A panel includes a plurality of first sensing electrodes and a plurality of second sensing electrodes. At least one of the first sensing electrodes includes multiple openings. The second sensing electrodes are located in the openings, respectively. The first sensing electrodes and the second sensing electrodes form a sensing layer.

20 Claims, 23 Drawing Sheets

(56) References Cited

U.S. PATENT DOCUMENTS

| | | | |
|---|---|---|---|
| 2017/0003778 A1* | 1/2017 | Shepelev | G06F 3/0414 |
| 2017/0003785 A1* | 1/2017 | Berget | G06F 3/0412 |
| 2017/0003791 A1* | 1/2017 | Berget | G06F 3/044 |
| 2017/0003792 A1* | 1/2017 | Berget | G06F 3/0416 |
| 2017/0010745 A1* | 1/2017 | Liu | G06F 3/0412 |
| 2017/0060314 A1* | 3/2017 | Shepelev | G06F 3/0416 |
| 2017/0090671 A1* | 3/2017 | Khazeni | G06F 3/0418 |
| 2017/0168604 A1* | 6/2017 | Schwartz | G06F 3/044 |
| 2017/0185197 A1* | 6/2017 | Shepelev | G06F 3/0412 |
| 2017/0185198 A1* | 6/2017 | Shepelev | G06F 3/0412 |
| 2017/0212616 A1* | 7/2017 | Zou | G06F 3/044 |

* cited by examiner

102d

102j

102m

PANEL

BACKGROUND

Technical Field

The present invention relates to a panel, and in particular, to a panel having touch sensing electrodes.

Related Art

Currently, touch technologies are mainly categorized into three touch technologies: OUT-CELL, ON-CELL, and IN-CELL, where OUT-CELL is the architecture with the longest development and the most mature technology. However, the current pressure touch sensing technology mainly uses a capacitive technology, and uses a film as a sensing electrode; a base material of the film may be polymide (PI), polyethylene terephthalate (PET), or the like, where the film is externally provided outside a panel.

However, externally providing a pressure sensing electrode outside the panel does not generate additional procedures, and the lamination stability of an OUT-CELL sensing electrode may affect a shipment yield of modules. Therefore, the practice of externally providing the pressure sensing electrode outside the panel faces a bottleneck in practice. How to incorporate the pressure sensing electrode within the panel without adding additional procedures in process is a challenge we currently face.

SUMMARY

At least one embodiment of the present invention lies in providing a panel, where the panel incorporates pressure sensing electrodes, and the current number of photomasks is not increased in process.

At least one embodiment of the present invention discloses a panel, where the panel includes a plurality of first sensing electrodes and a plurality of second sensing electrodes. At least one of the first sensing electrodes includes multiple openings. The second sensing electrodes are located in the openings, respectively. The first sensing electrodes and the second sensing electrodes form a sensing layer.

Based on the above, at least one embodiment of the present invention provides a panel, where the panel includes first sensing electrodes and second sensing electrodes; the second sensing electrodes are located in openings of the first sensing electrodes, and the first sensing electrodes and the second sensing electrodes form a sensing layer. Therefore, the sensing layer can be used to perform touch location detection and touch pressure detection.

Based on the above, at least one embodiment of the present invention provides a panel; first sensing electrodes and second sensing electrodes can be formed in a same forming layer with only a same photomask; the function of touch pressure sensing can be incorporated on a panel architecture of IN-CELL without increasing the current number of photomasks in process.

The foregoing description of content of the present disclosure and the following description of embodiments are used to exemplify and explain the spirit and principles of the present invention, and provide further understanding of the claims of the present invention.

DETAILED DESCRIPTION

Detailed features and advantages of the present invention are described in detail below in implementation manners, and content thereof can sufficiently enable any person skilled in the art to learn technical content of the present invention and implement the present invention according to the technical content of the present invention, and according to content disclosed in the present specification, the claims, and drawings, any person skilled in the art can easily understand relevant objectives and advantages of the present invention. The following embodiments further describe viewpoints of the present invention, but are not intended to limit the scope of the present invention by using any viewpoint.

Figure 1:
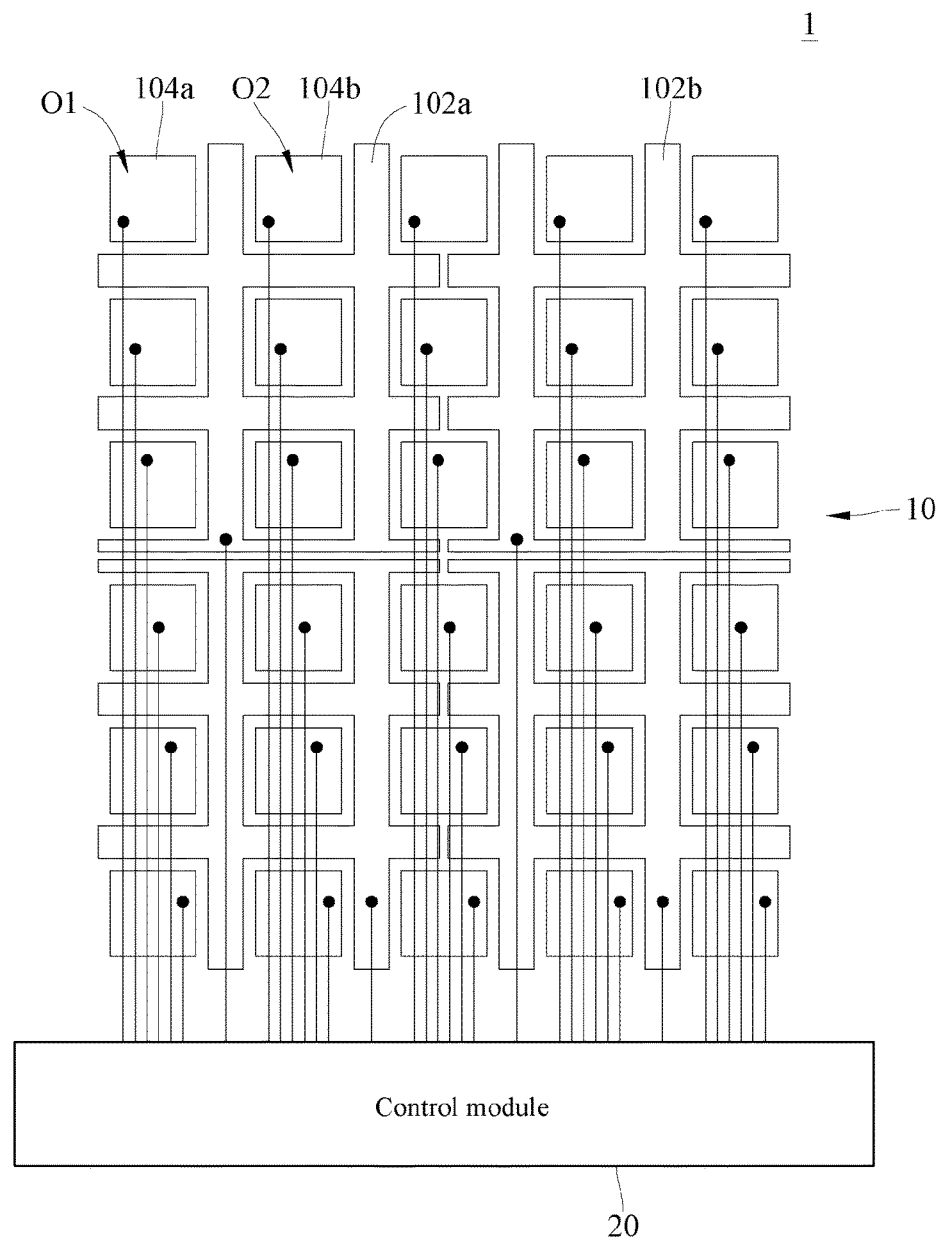
FIG. 1 is a schematic layout diagram of a sensing layer of a panel drawn according to one embodiment of the present invention.

Referring to FIG. 1, FIG. 1 is a schematic layout diagram of a sensing layer of a panel drawn according to an embodiment of the present invention. A panel 1 includes multiple first sensing electrodes and multiple second sensing electrodes. The first sensing electrodes include a plurality of openings. The second sensing electrodes are located in the openings, where the first sensing electrodes and the second sensing electrodes form a sensing layer 10. The sensing layer 10 of the panel 1 includes more first sensing electrodes and second sensing electrodes. The number of the first sensing electrodes and the number of the second sensing electrodes are not limited to what drawn in drawings. In addition, for concise narration, first sensing electrodes 102*a* and 102*b* and second sensing electrodes 104*a* and 104*b* are marked in FIG. 1 for description. However, after reading the present specification in detail, a person of ordinary skill in the art can learn relative relationships in structure between the remaining first sensing electrodes and second sensing electrodes with reference to drawings. In subsequent written introduction, only some of multiple similar elements are listed for brief description.

As shown in FIG. 1, the first sensing electrode 102*a* includes multiple openings. Only one opening O1 and one opening O2 are marked herein as examples for brief description, but not limited thereto. The second sensing electrode 104*a* is located in the opening O1; and the second sensing electrode 104*b* is located in the opening O2. From another perspective, the first sensing electrodes 102*a* and 102*b* and the second sensing electrodes 104*a* and 104*b* may be formed by performing an etching process on a sensing material layer (not marked) using a same photomask. For example, a part of the first sensing electrode 102*a* surrounds at least a part of the second sensing electrodes 104*a* and 104*b*. The first sensing electrodes 102*a* and 102*b* are respectively coupled to a pressure sensing circuit in a control module 20, and the second sensing electrodes 104*a* and 104*b* are respectively couple to a location sensing circuit in the control module 20. In other words, the first sensing electrodes 102*a* and 102*b* are used to perform touch pressure sensing, and the second sensing electrodes 104*a* and 104*b* are used to perform touch location sensing. Therefore, the sensing layer 10 is a sensing layer that incorporates touch pressure and touch locations. For example, on a same plane, the first sensing electrodes do not contact each other; the second sensing electrodes do not contact each other, and the first sensing electrodes and the second sensing electrodes do not contact each other, either.

Figure 2:
FIG. 2 is a schematic cascaded diagram of a panel drawn according to one embodiment of the present invention.

Next, referring to FIG. 2, FIG. 2 is a schematic cascaded diagram of a panel drawn according to an embodiment of the present invention. As shown in FIG. 2, the panel 1, for example, further includes an active element layer 12 and a reference layer 14. The sensing layer 10 is located between the active element layer 12 and the reference layer 14. In FIG. 2, for description convenience, other elements between the active element layer 12, the sensing layer 10, and the reference layer 14 are not drawn, and therefore only the active element layer 12, the sensing layer 10, and the reference layer 14 are drawn. The active element layer 12, for example, further includes an active element array and multiple pixel electrodes, which are electrically connected to the active element array. The sensing layer 10, for example, is a common electrode layer on the panel 1. The reference layer 14, for example, is a conductive layer located on a panel color filter substrate or a conductive adhesive on a polarizer, but not limited thereto.

Figure 10A:
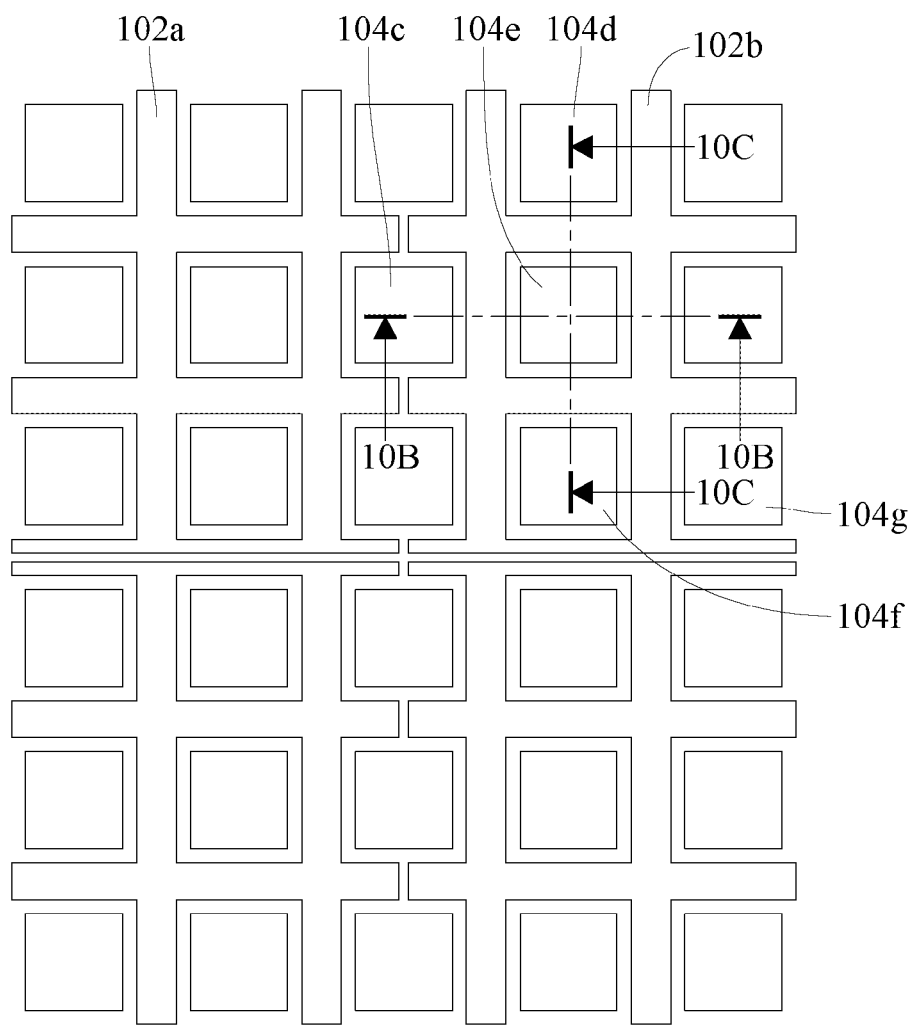
FIG. 10A is a schematic layout diagram of a simplified version drawn according to an embodiment of FIG. 1.
Figure 10B:
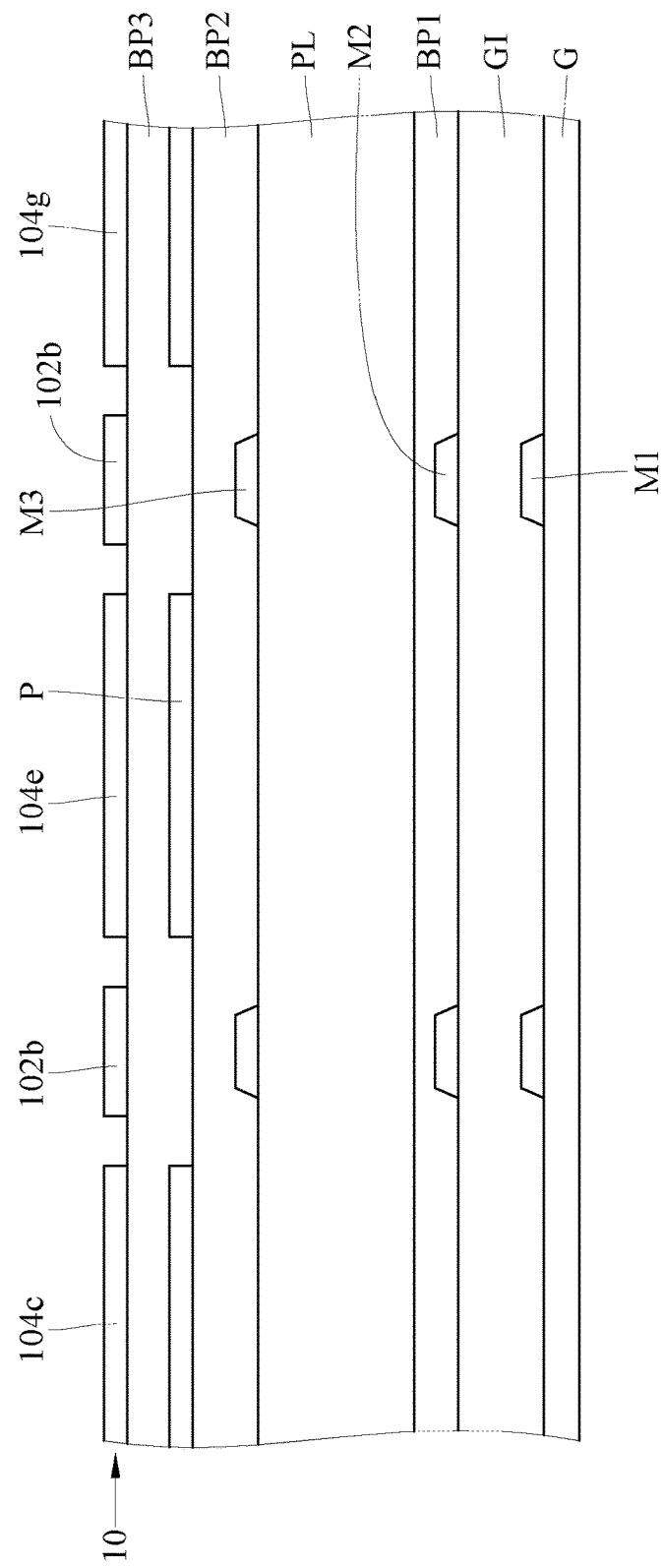
FIG. 10B is a schematic sectional diagram according to 10B-10B section in FIG. 10A.
Figure 10C:
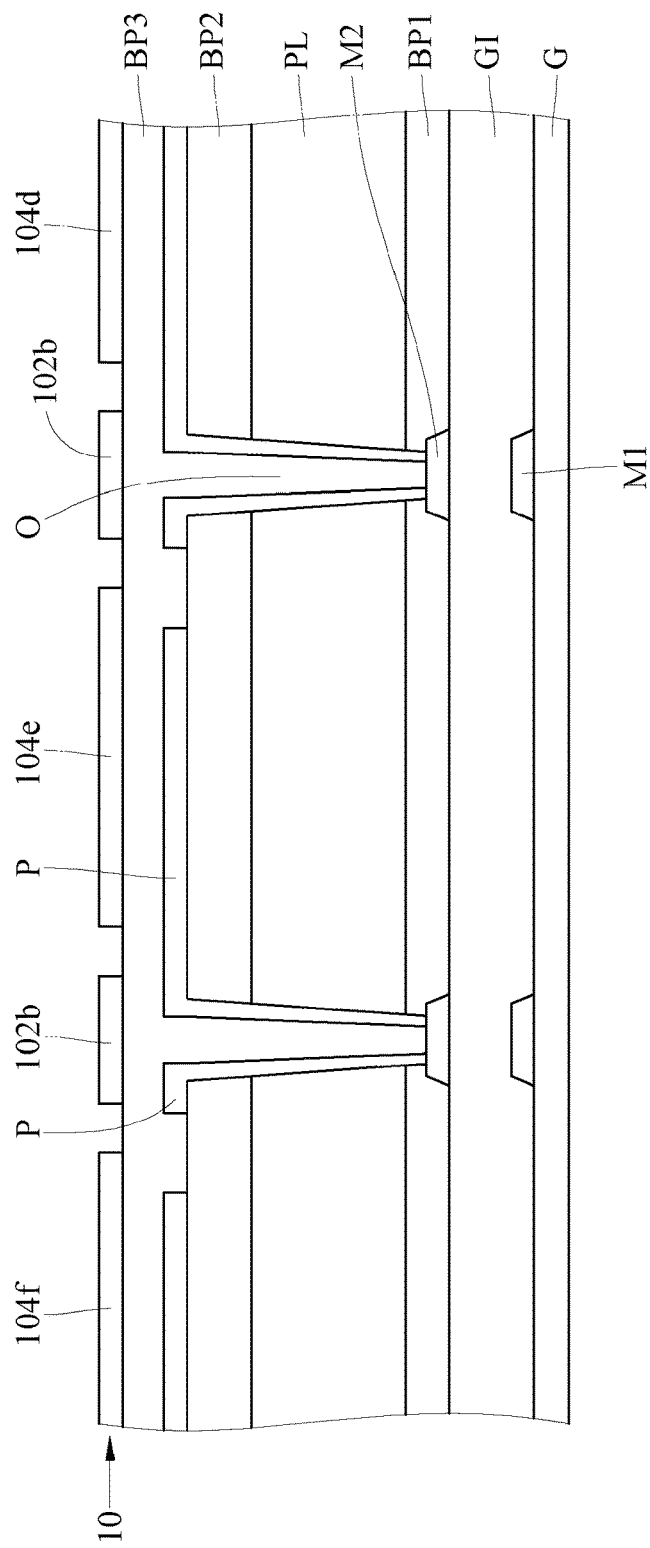
FIG. 10C is a schematic sectional diagram according to 10C-10C section in FIG. 10A.

Next, referring to FIG. 10A to FIG. 10C, more detailed narration is made on a possible structure of the panel 1. FIG. 10A is a schematic layout diagram of a simplified version drawn according to an embodiment of FIG. 1. FIG. 10C is a schematic sectional diagram according to section line 10C-10C in FIG. 10A. The sensing layer 10 shown in FIG. 10A is similar to the sensing layer 10 shown in FIG. 1. The control module and relevant conducting wires are not drawn in FIG. 10A, so as to clearly mark locations of the section line 10B-10B and the section line 10C-10C. It should be noted that FIG. 10A to FIG. 10C and relevant narration are used to describe relative cascaded relationships between the sensing layer 10 and other elements of the panel 1. Therefore, what drawn in FIG. 10A to FIG. 10C is not used to limit actual shapes or relative size ratios between the layers. In addition, in actual process, each forming layer may not be necessarily as smooth as shown in drawings, and may have concave, convex, or overflowing parts, and details are not described herein again.

As shown in FIG. 10B and FIG. 10C, the panel 1, for example, further includes a substrate G, conductor layers M1, M2, and M3, insulation layers GI, BP1, BP2, BP3, and PL, and pixel electrodes P. In this embodiment, the substrate G, the conductor layers M1, M2, and M3, the insulation layers GI, BP1, BP2, BP3, and PL, and the pixel electrodes P form a cascading structure, and the sensing layer 10 is located on the cascading structure. The conductor layer M1 is located on the substrate G. The insulation layer GI is located on the substrate G and covers the conductor layer M1. The conductor layer M2 is located on the insulation layer GI. The insulation layer BP1 is located on the insulation layer GI and covers at least a part of the conductor layer M2. The insulation layer PL is located on the insulation layer BP1 so as to form a flat layer. The conductor layer M3 is located on the insulation layer PL. The insulation layer BP2 is located on the insulation layer PL and covers the conductor layer M3. The pixel electrodes P are located on the insulation layer BP2. The insulation layer BP3 covers the pixel electrodes P. The insulation layer BP1, the insulation layer PL, and the insulation layer BP2 are etched to form an hole O. At least a part of the conductor layer M2 is exposed to the hole O. The pixel electrodes P contact the conductor layer M2 via the hole O. A part of the insulation layer BP3 is located in the hole O. As shown in drawings, the sensing layer 10 is located on the insulation layer BP3.

The conductor layer M1, for example, is used as a scan line or a gate of a thin film transistor, and the conductor layer M2, for example, is used as a data line, or a source or a drain of the thin film transistor. In an embodiment, the conductor layer M3 penetrates through the insulation layer BP3 to be respectively electrically connected to the first sensing electrodes or respectively electrically connected to the second sensing electrodes, and the conductor layer M3 is further connected to the control module 20, and the conductor layer M3 is, for example, used as a conducting wire for transmitting relevant touch sensing signals.

In the embodiment described by using FIG. 10B and FIG. 10C, the panel 1 uses a top-com structure; after reading the present specification in detail, a person of ordinary skill in the art can understand that the panel 1 may also use a bottom-com structure. In an embodiment in which the panel 1 may also use the bottom-com structure, the sensing layer 10, for example, is located between the insulation layer BP2 and the insulation layer BP3, and the pixel electrodes P are located on the insulation layer BP3. The insulation layers PL and BP1 to BP3 are etched to form a hole; at least a part of the conductor layer M2 is exposed to the hole; and the pixel electrodes P contact the conductor layer M2 via the hole. The top-com and bottom-com structures only lie in describing that one of the pixel electrodes and the sensing layer that is used as a common electrode is relatively close to the substrate, and the other is relatively far from the substrate. Therefore, the foregoing embodiment is not intended to limit that the pixel electrodes and the sensing layer must be located between the foregoing forming layers. On the other aspect, for concise narration herein, FIG. 10B and FIG. 10C are listed for exemplary description. A relative size ratio of the pixel electrodes to the first sensing electrodes or a relative size ratio of the pixel electrodes to the second sensing electrodes is not limited to the drawings. In an embodiment, the first sensing electrodes and the second sensing electrodes both stretch across the multiple pixel electrodes. From another perspective, in this embodiment, orthographic projections of the first sensing electrodes and the second sensing electrodes on the substrate G respectively cover orthographic projections of the multiple pixel electrodes on the substrate G.

Figure 11A:
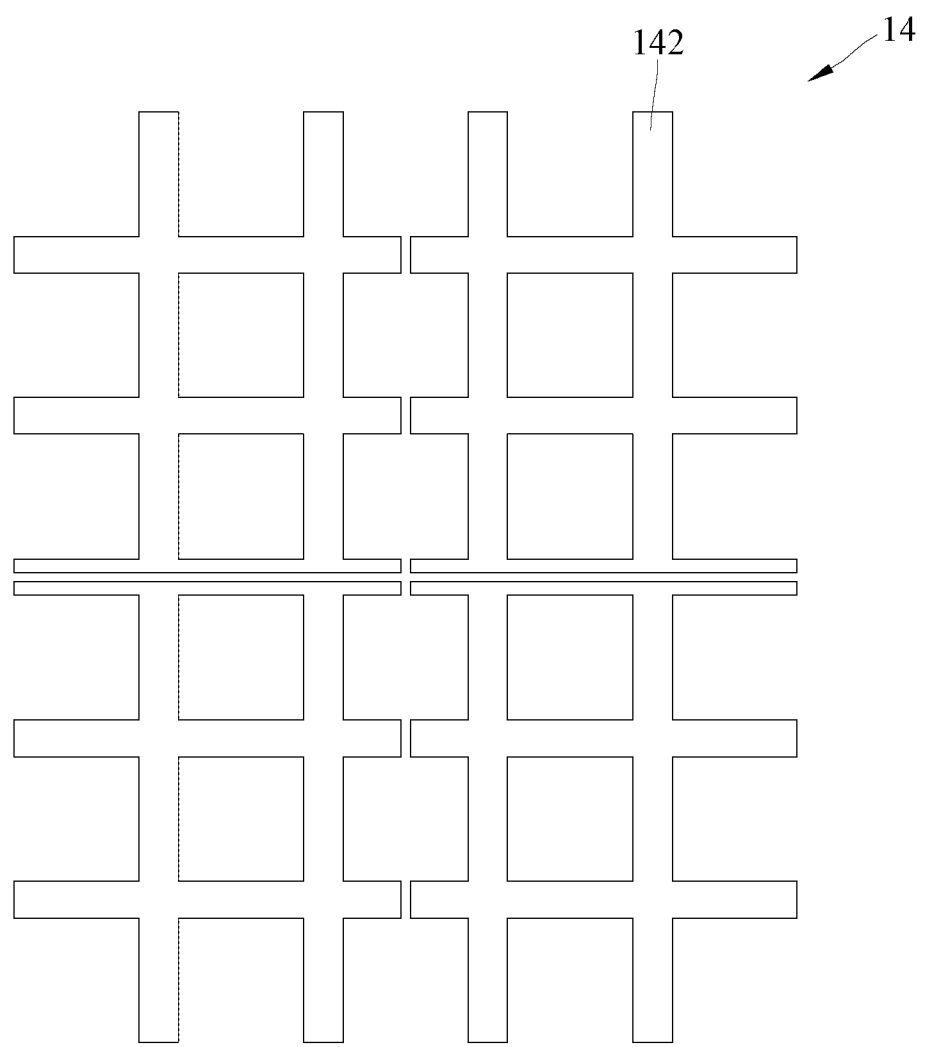
FIG. 11A is a schematic layout diagram of a reference layer drawn according to one embodiment of the present invention.
Figure 11B:
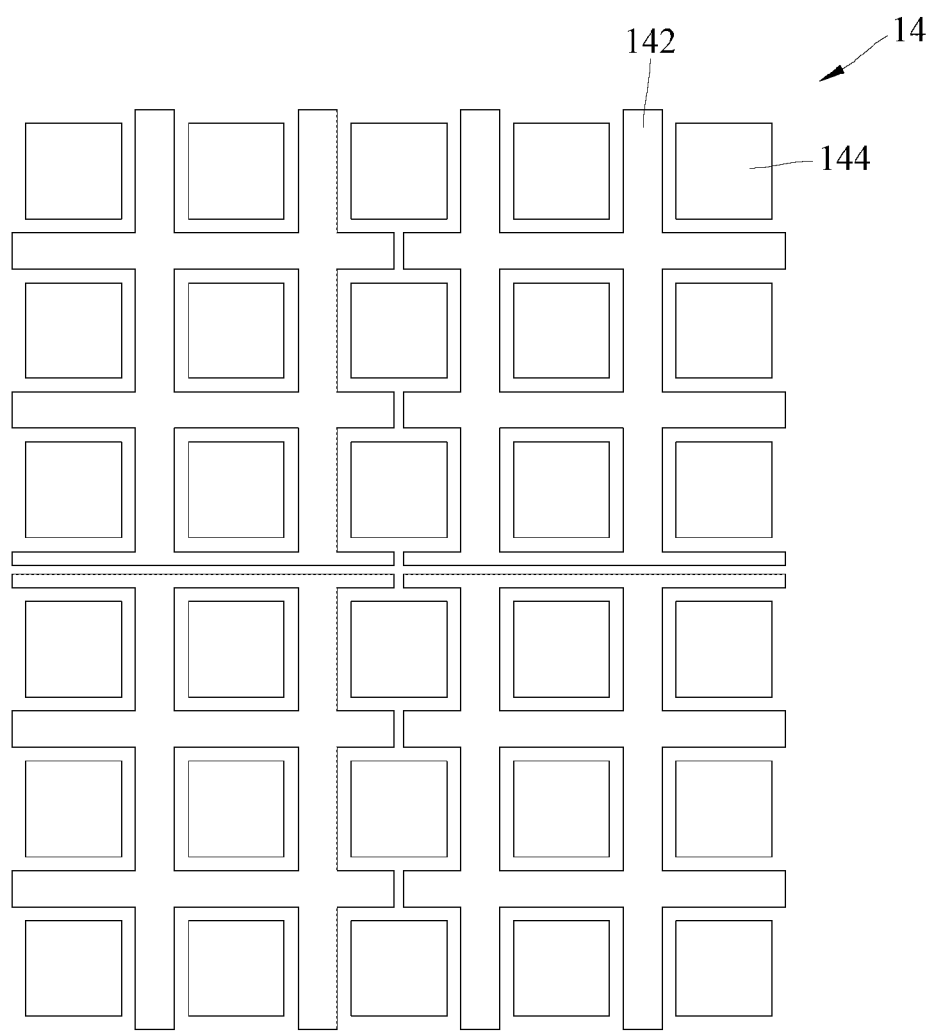
FIG. 11B is a schematic layout diagram of a reference layer drawn according to one embodiment of the present invention.

Next, referring to FIG. 11A and FIG. 11B, implementation patterns of the reference layer are described. FIG. 11A is a schematic layout diagram of a reference layer drawn according to an embodiment of the present invention. FIG. 11B is a schematic layout diagram of a reference layer drawn according to another embodiment of the present invention. As shown in FIG. 11A, the reference layer 14 includes a reference electrode 142, which, for example, is electrically connected to ground or receives a direct current signal. The reference electrode includes multiple openings. The multiple openings of the reference electrode 142 are respectively corresponding to and overlapping with the openings of the first sensing electrodes. From another perspective, an orthographic projection of an entity part of the reference electrode 142 on the substrate G is overlapping with orthographic projections of entity parts of the first sensing electrodes on the substrate G. In an embodiment, the orthographic projection of the entity part of the reference electrode 142 on the substrate G is completely overlapping with the orthographic projections of the entity parts of the first sensing electrodes on the substrate G. In other words, in this embodiment, the reference electrode 142 may be obtained by performing a similar etching process using a photomask similar to that used for the sensing layer 10. Therefore, the reference electrode 14 has a pattern similar to that of the sensing layer 10. In another embodiment, the orthographic projection of the entity part of the reference electrode 142 on the substrate G covers the orthographic projections of the entity parts of the first sensing electrodes on the substrate G. In this embodiment, the touch force detection effect is improved by means of the reference electrode that has a relatively large area.

However, as shown in FIG. 11B, in the embodiment shown in FIG. 11B, the reference layer 14 further includes a visual auxiliary part 144. The visual auxiliary part 144 is located in the openings of the reference electrode 142, and does not contact the reference electrode 142. In an embodiment, a shape and an area of the visual auxiliary part 144 are designed as similar to those of the openings of the reference electrode 142. In the embodiment shown in FIG. 11B, the reference layer 14 provided with the visual auxiliary part 144 tends to be more like a complete plane, so that a visual feeling of a user on the panel is improved. In an embodiment, a voltage level of the visual auxiliary part 144 is floating, so as to avoid interfering with or shielding relevant signals detected at touch locations. In the embodiment shown in FIG. 11A and FIG. 11B, the reference layer 14, for example, is formed by patterning a conductor layer; a material of the conductor layer is, for example, indium tin oxide (ITO), but the present embodiment is not limited thereto. In fact, in other varied examples different from the embodiment shown in FIG. 11A and FIG. 11B, the reference layer 14 is a complete plane without patterning, so that a visual effect is improved. In this embodiment, the reference layer 14, for example, is a conductive adhesive provided on a polarizer, and an electrical resistivity of the conductive adhesive, for example, is $10^8$ to $10^{10}$ ($\Omega$m), so as to avoid interfering with or shielding relevant signals detected at touch locations.

Figure 3A:
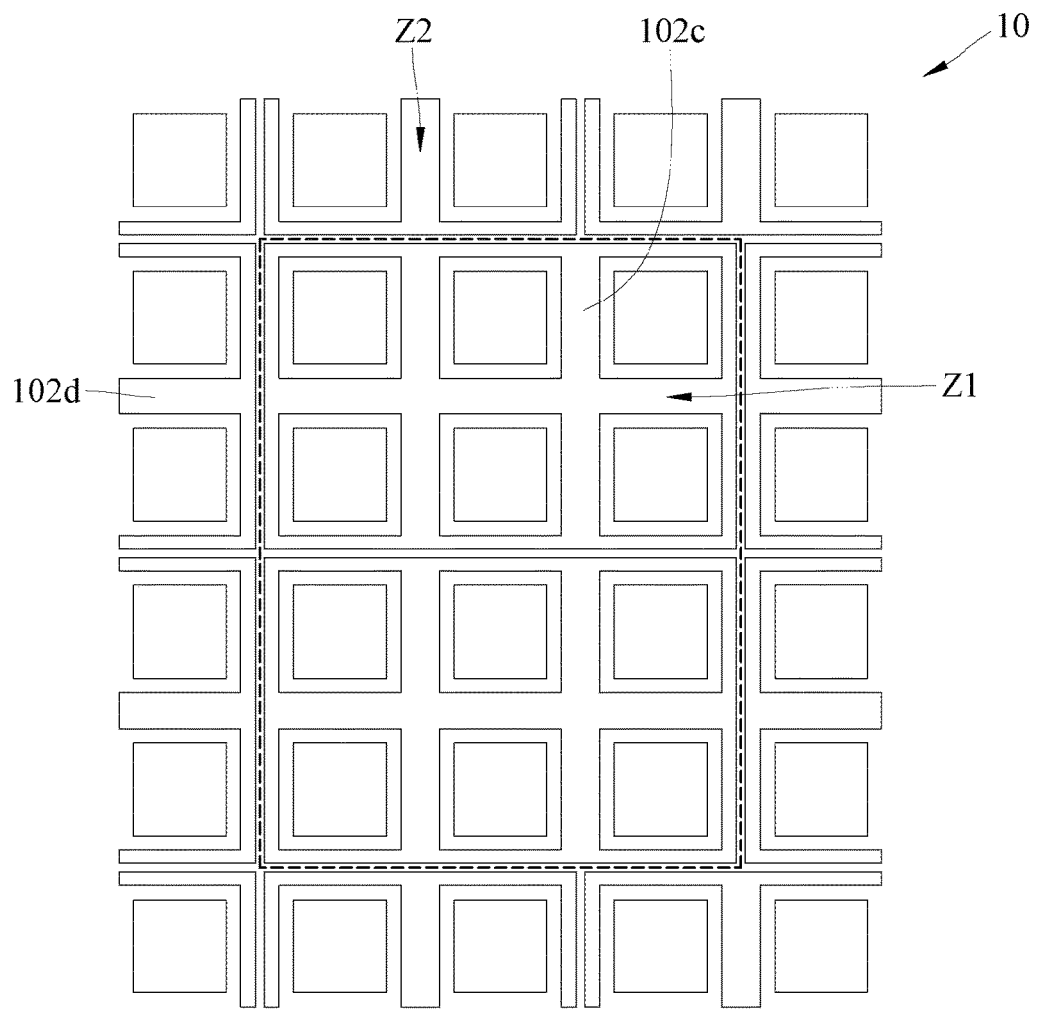
FIG. 3A is a schematic layout diagram of a sensing layer of a panel drawn according to one embodiment of the present invention.
Figure 3B:
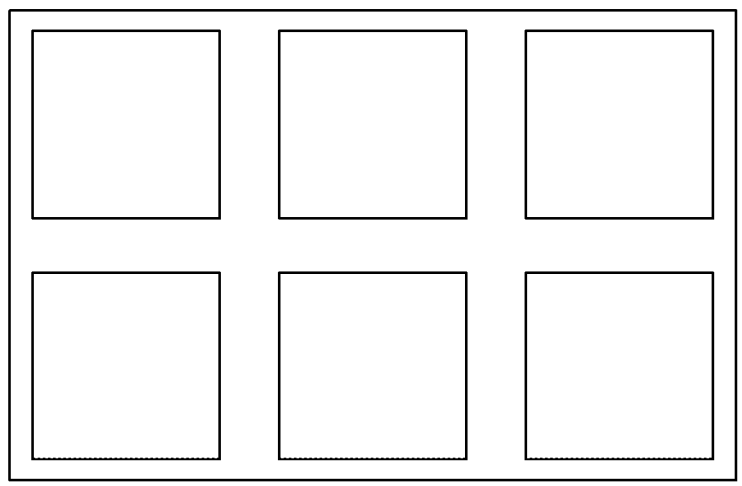
FIG. 3B is a schematic diagram of a pattern of one first zone sensing electrode of FIG. 3A.
Figure 3C:
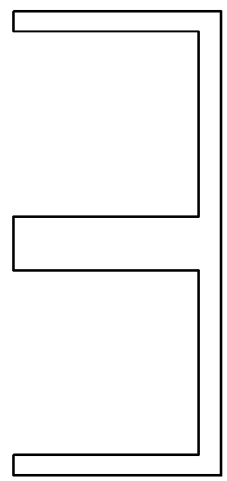
FIG. 3C is a schematic diagram of a pattern of one second zone sensing electrode of FIG. 3A.
Figure 4A:
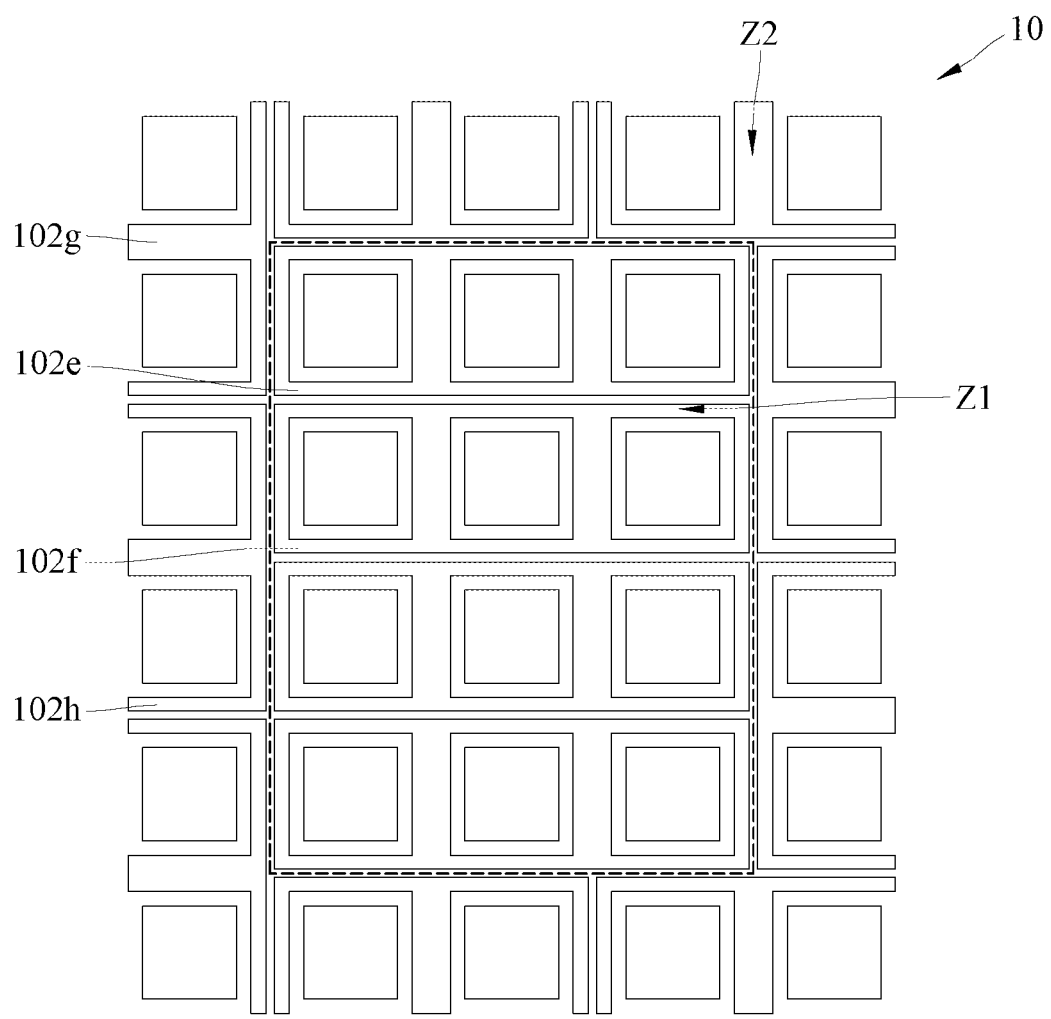
FIG. 4A is a schematic layout diagram of a sensing layer of a panel drawn according to one embodiment of the present invention.
Figure 4B:
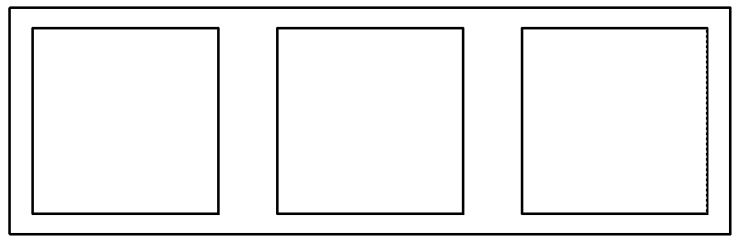
FIG. 4B is a schematic diagram of a pattern of one first zone sensing electrode of FIG. 4A.
Figure 4C:
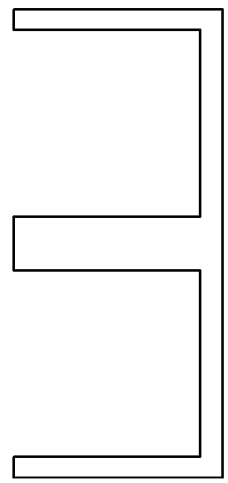
FIG. 4C is a schematic diagram of a pattern of one second zone sensing electrode of FIG. 4A.
Figure 5A:
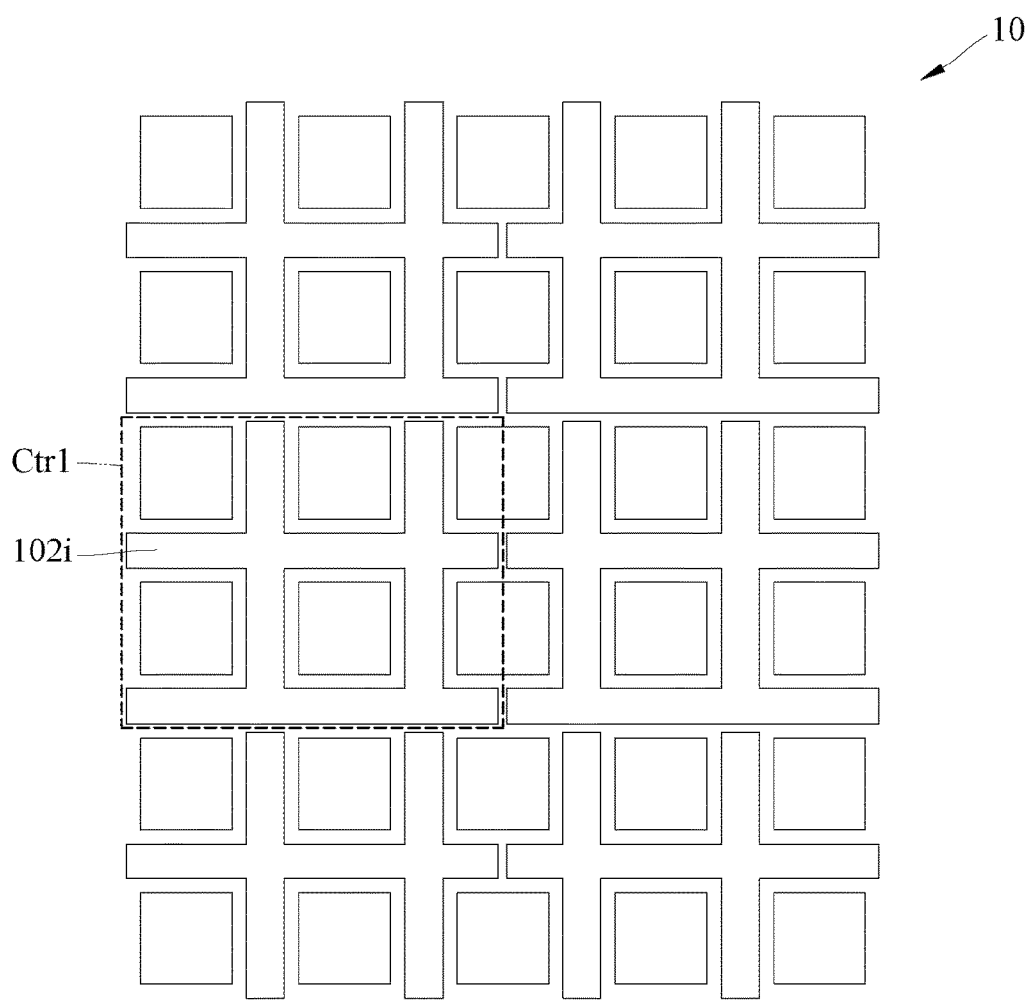
FIG. 5A is a schematic layout diagram of a sensing layer of a panel drawn according to one embodiment of the present invention.
Figure 5B:
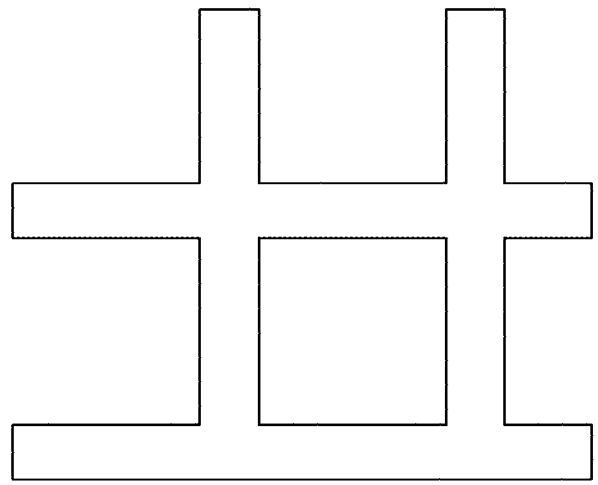
FIG. 5B is a schematic diagram of a pattern of one first sensing electrode of FIG. 5A.
Figure 6A:
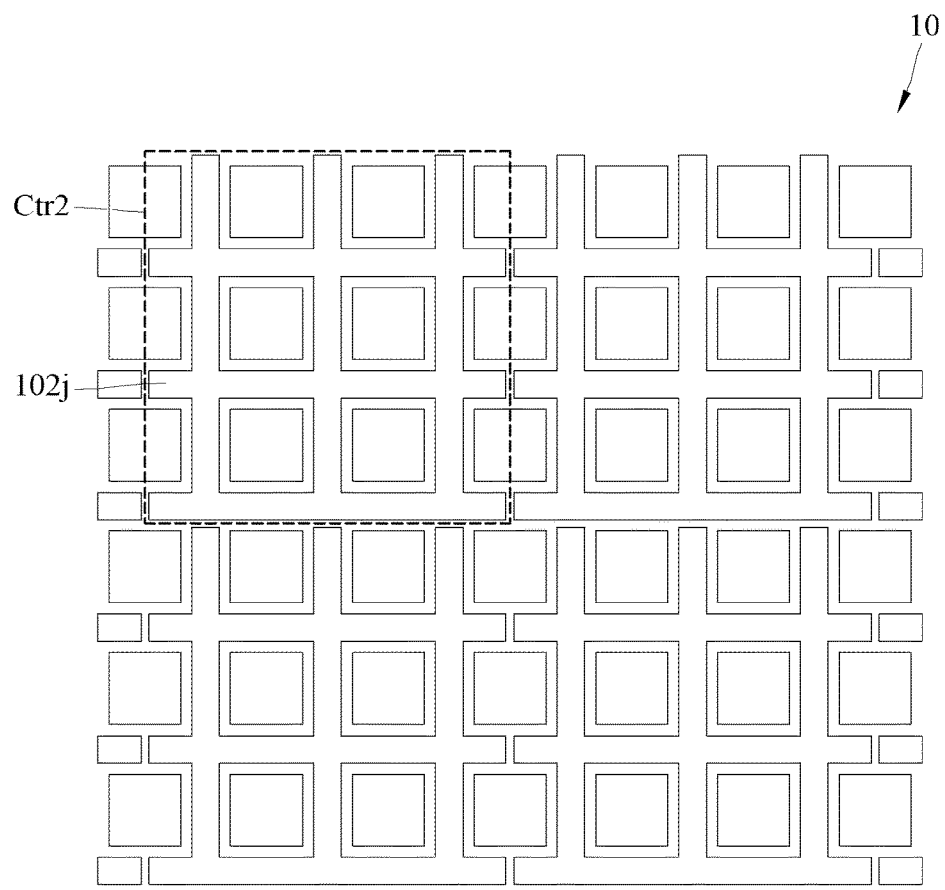
FIG. 6A is a schematic layout diagram of a sensing layer of a panel drawn according to one embodiment of the present invention.
Figure 6B:
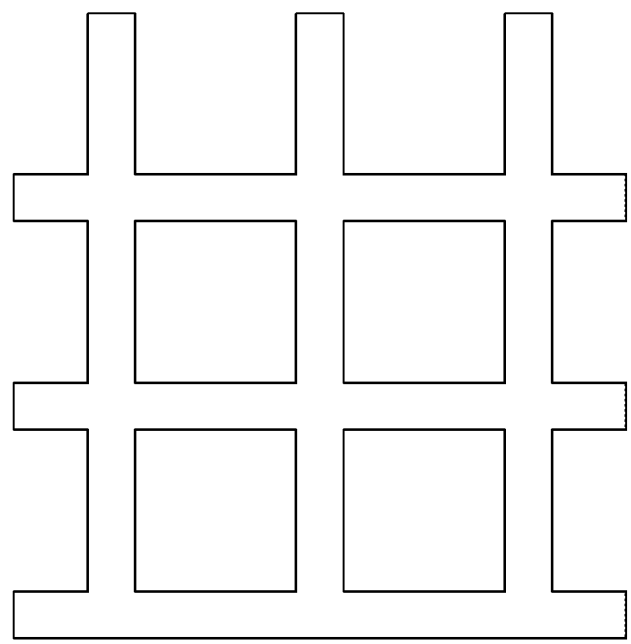
FIG. 6B is a schematic diagram of a pattern of one first sensing electrode of FIG. 6A.

The foregoing first sensing electrodes may further be distinguished into a plurality of first zone sensing electrodes and a plurality of second zone sensing electrodes. Next, referring to FIG. 3A to FIG. 3C, description is made. FIG. 3A is a schematic layout diagram of a sensing layer of a panel drawn according to another embodiment of the present invention. FIG. 3B is a schematic diagram of a pattern of one first zone sensing electrode therein drawn according to FIG. 3A. FIG. 3C is a schematic diagram of a pattern of one second zone sensing electrode therein drawn according to FIG. 3A. FIG. 4A is a schematic layout diagram of a sensing layer of a panel drawn according to another embodiment of the present invention. FIG. 4B is a schematic diagram of a pattern of one first zone sensing electrode therein drawn according to FIG. 4A. FIG. 4C is a schematic diagram of a pattern of one second zone sensing electrode therein drawn according to FIG. 4A.

In the embodiment shown in FIG. 3A to FIG. 3C, the sensing layer 10 defines a first zone Z1 and a second zone Z2. The range surrounded by the rectangular dashed box is the first zone Z1, and the range outside the rectangular dashed box is the second zone Z2. The second zone Z2 substantially surrounds the first zone Z1. A first sensing electrode 102c located in the first zone Z1 is defined as the first zone sensing electrode, and a first sensing electrode 102d located in the second zone Z2 is defined as the second zone sensing electrode. As shown in FIG. 3B, each first zone sensing electrode corresponds to six second sensing electrodes. However, as shown in FIG. 3C, each second zone sensing electrode corresponds to some edges of two second sensing electrodes and has a comb structure. An area of each first zone sensing electrode is greater than that of each second zone sensing electrode.

However, as shown in FIG. 4A to FIG. 4C, in the embodiment shown in FIG. 4A to FIG. 4C, areas and shapes of first zone sensing electrodes 102e and 102f are different from those of the first zone sensing electrodes shown in FIG. 3A to FIG. 3C. In practice, areas and shapes of the first zone sensing electrodes and the second zone sensing electrodes can be freely designed by a person of ordinary skill in the art after the person of ordinary skill in the art reads this embodiment in detail, and are not limited to the foregoing example. As shown in FIG. 4B, each first zone sensing electrode corresponds to three second sensing electrodes. However, as shown in FIG. 4C, each second zone sensing electrode corresponds to some edges of two second sensing electrodes. An area of the first zone sensing electrode is greater than that of the second zone sensing electrode. The foregoing is only for exemplary demonstration, and the number of the second sensing electrodes corresponding to the first zone sensing electrodes and the second zone sensing electrodes is not limited herein.

In addition, according to FIG. 3A to FIG. 4C, the area of at least one of the multiple first zone sensing electrodes is a first area, and the area of at least one of the multiple second zone sensing electrodes is a second area, the first area being different from the second area. That is, the size of the top surface of the at least one of the multiple first zone sensing electrodes is different from that of the at least one of the multiple second zone sensing electrodes. In an embodiment, the first area is greater than the second area, and a ratio of the second area to the first area is about 0.3 to 0.99. In another embodiment, the second area is greater than the first area, and a ratio of the first area to the second area is about 0.3 to 0.99. However, in other varied examples, each first zone sensing electrode has the first area, and each second zone sensing electrode has the second area. As compared with a central part of the sensing layer 10, it is difficult for an edge part of the sensing layer 10 to generate deformation. As regards FIG. 3A and FIG. 4A, as compared with the first zone sensing electrodes, it is difficult for the second zone sensing electrodes to generate deformation so that errors of pressure touch detection may be generated. By adjusting an area ratio of the first zone sensing electrodes to the second zone sensing electrodes, a deformation quantity of the first zone sensing electrodes and the second zone sensing electrodes under same pressure can be suitably fine tuned, so as to correct a capacitance variation caused by the deformation quantity, thereby further adjusting an error range of pressure touch detection.

Due to mechanism characteristics, zone categories of the sensing layer 10 are not limited to only two types. After reading this embodiment in detail, a person of ordinary skill in the art can freely design the zone categories of the sensing layer 10, which are not limited to the foregoing example.

Figure 7A:
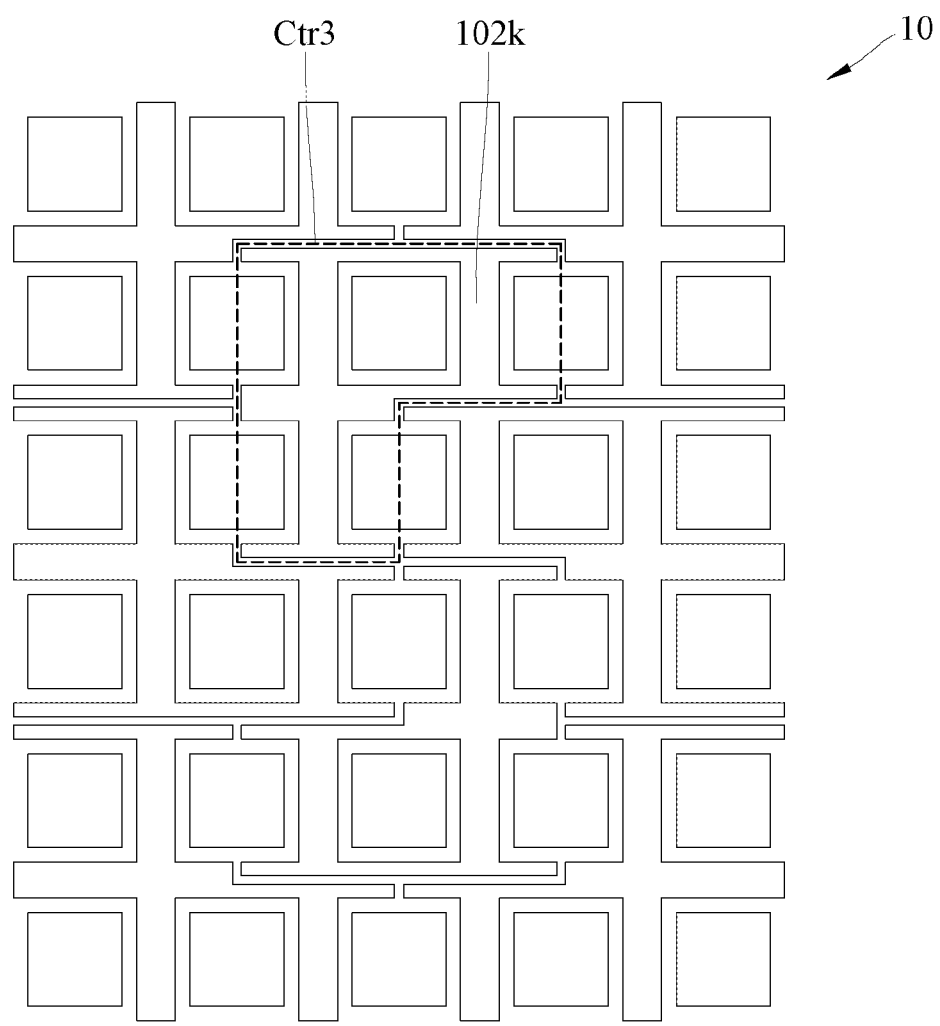
FIG. 7A is a schematic layout diagram of a sensing layer of a panel drawn according to one embodiment of the present invention.
Figure 7B:
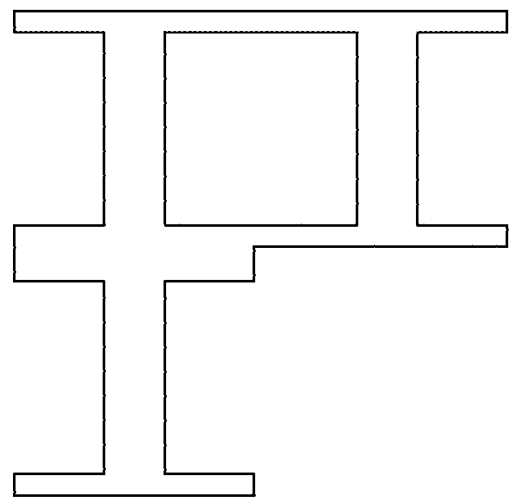
FIG. 7B is a schematic diagram of a pattern of one first sensing electrode of FIG. 7A.
Figure 8A:
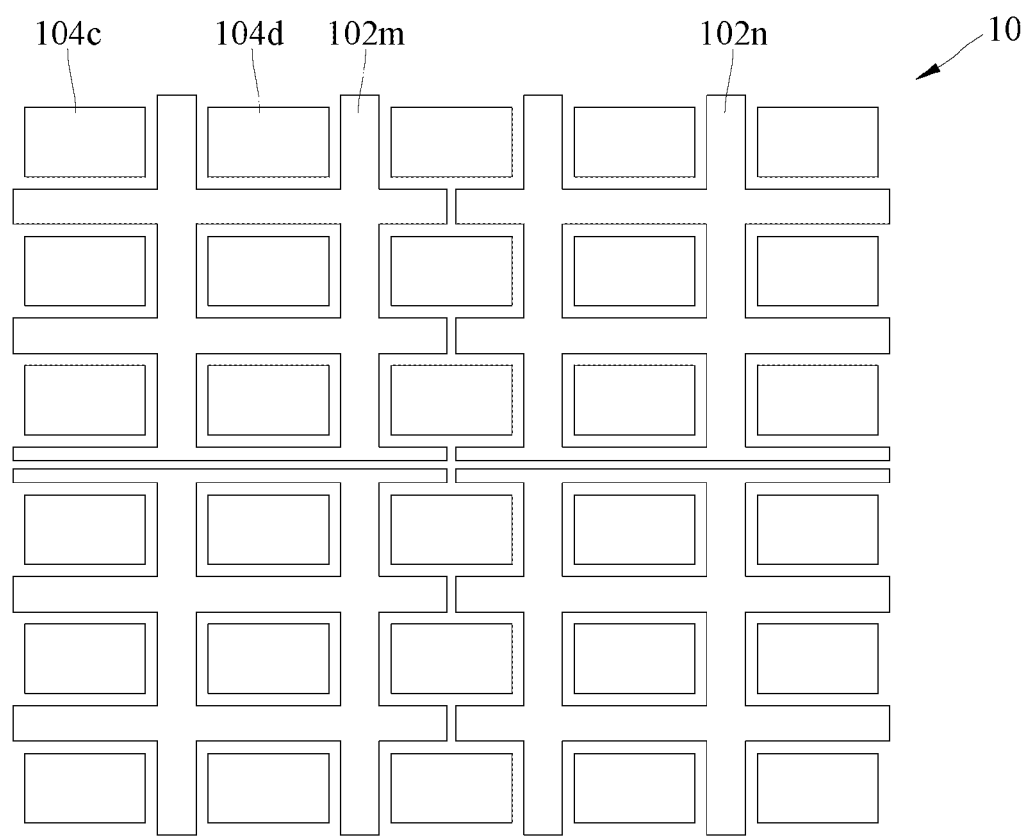
FIG. 8A is a schematic layout diagram of a sensing layer of a panel drawn according to one embodiment of the present invention.
Figure 8B:
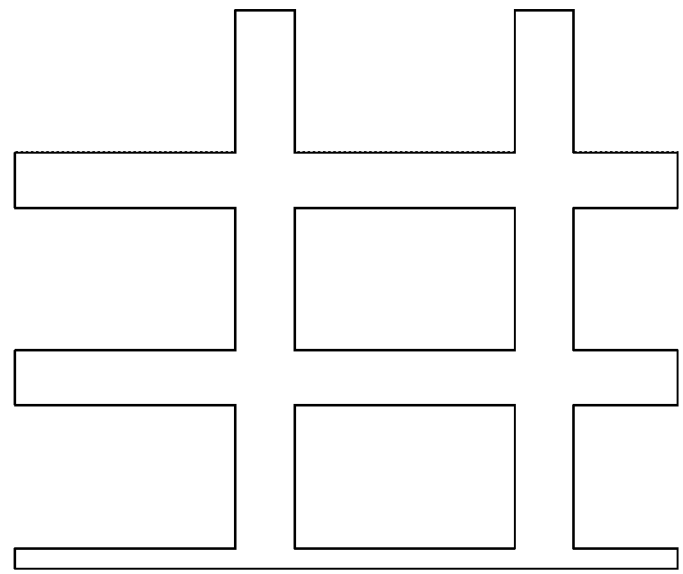
FIG. 8B is a schematic diagram of a pattern of one first sensing electrode of FIG. 8A.

Next, referring to FIG. 5A to FIG. 7B, FIG. 5A is a schematic layout diagram of a sensing layer of a panel drawn according to another embodiment of the present invention; FIG. 5B is a schematic diagram of a pattern of one first sensing electrode therein drawn according to FIG. 5A; FIG. 6A is a schematic layout diagram of a sensing layer of a panel drawn according to another embodiment of the present invention; FIG. 6B is a schematic diagram of a pattern of one first sensing electrode therein drawn according to FIG. 6A; FIG. 7A is a schematic layout diagram of a sensing layer of a panel drawn according to another embodiment of the present invention; and FIG. 7B is a schematic diagram of a pattern of one first sensing electrode therein drawn according to FIG. 7A. In the embodiments shown in FIG. 5A, FIG. 6A and FIG. 7A, the sensing layers 10 respectively include a first sensing electrode 102i, a first sensing electrode 102j, and a first sensing electrode 102k. The first sensing electrode 102i has a peripheral contour Ctr1. The first sensing electrode 102j has a peripheral contour Ctr2. The first sensing electrode 102k has a peripheral contour Ctr3. As shown in the drawings, a shape of the peripheral contour Ctr1 is a rectangle; a shape of the peripheral contour Ctr2 is a square; and a shape of the peripheral contour Ctr3 is an L shape. When the peripheral contours of the first sensing electrodes are different, sensing capabilities or sensing sensibilities of the first sensing electrodes are also different. In practice, shapes of the peripheral contours can be freely designed by a person of ordinary skill in the art after the person of ordinary skill in the art reads this embodiment in detail, and are not limited to the foregoing example.

Figure 9A:
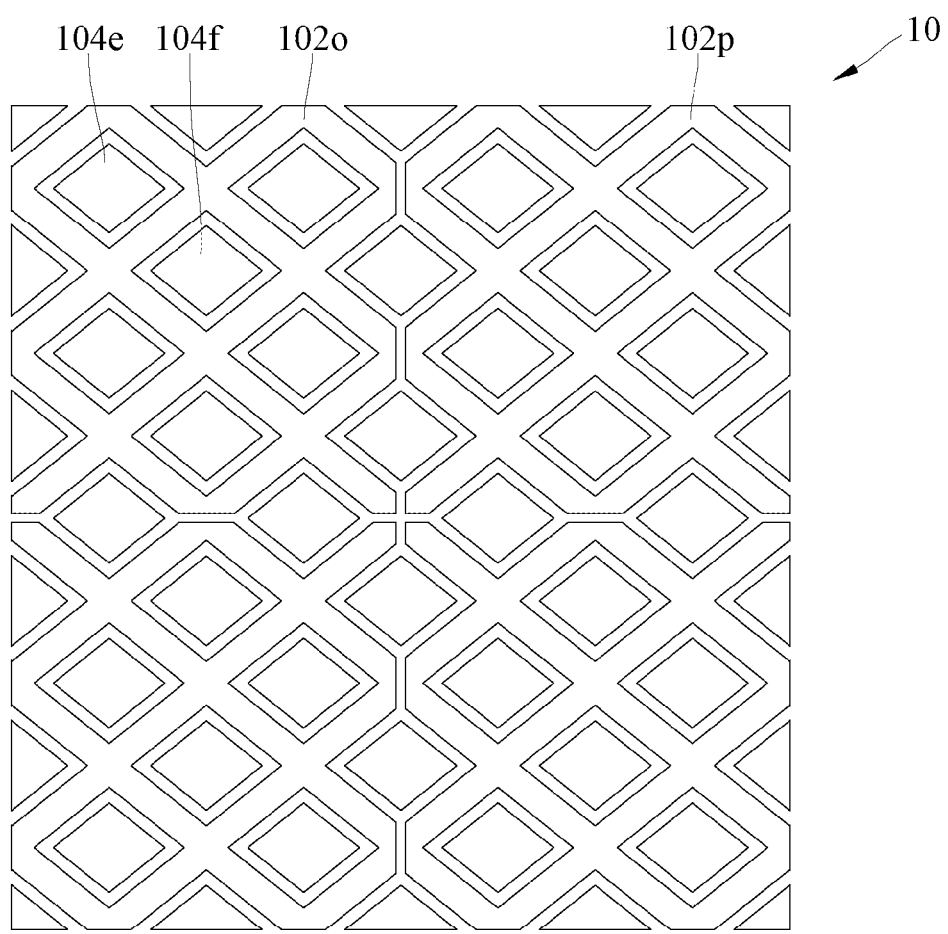
FIG. 9A is a schematic layout diagram of a sensing layer of a panel drawn according to one embodiment of the present invention.
Figure 9B:
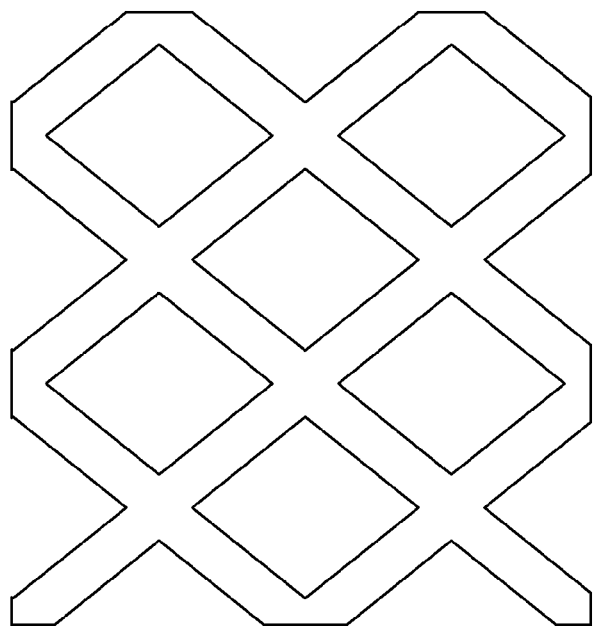
FIG. 9B is a schematic diagram of a pattern of one first sensing electrode of FIG. 9A.

Next, referring to FIG. 8A to FIG. 9B, FIG. 8A is a schematic layout diagram of a sensing layer of a panel drawn according to another embodiment of the present invention; FIG. 8B is a schematic diagram of a pattern of one first sensing electrode therein drawn according to FIG. 8A; FIG. 9A is a schematic layout diagram of a sensing layer of a panel drawn according to another embodiment of the present invention; and FIG. 9B is a schematic diagram of a pattern of one first sensing electrode therein drawn according to FIG. 9A. In the embodiment shown in FIG. 8A and FIG. 8B, shapes of second sensing electrodes 104c and 104d are approximately a rectangle. In the embodiment shown in FIG. 9A and FIG. 9B, shapes of second sensing electrodes 104e and 104f are approximately rhombuses. In practice, shapes of the second sensing electrodes may be an N-gon, where N is a positive integer or a multiple of 4, so as to improve a visual effect of the panel 1. When N is an even number, it is easy to make a shape of each sensing electrode symmetrical in implementation. Shapes of the second sensing electrodes can be freely designed by a person of ordinary skill in the art according to actual requirements after the person of ordinary skill in the art reads the present specification in detail, and are not limited to the foregoing example. However, in a case in which the second sensing electrodes have different shapes, the first sensing electrodes may also be patterned into different shapes, as stated above, for example, squares, rectangles, or rhombuses, so that the sensing layer 10 can have multiple possible implementation patterns by means of differential pattern pairing between the first sensing electrodes and the second sensing electrodes.

The opening mentioned in the at least one embodiment of the present invention may be an opening completely surrounded by the entity portion of the electrode (first sensing electrode or reference electrode) or partially surrounded by the entity portion of the electrode (first sensing electrode or reference electrode), but not limited thereto. The opening partially surrounded by the entity portion of the electrode (first sensing electrode or reference electrode) may has, for example, an aperture toward another electrode (first sensing electrode or reference electrode) along an horizontal direction parallel to the surface of the sensing layer.

Based on the above, at least one embodiment of the present invention provides a panel, where the panel includes first sensing electrodes and second sensing electrodes; the second sensing electrodes are located in openings of the first sensing electrodes, and the first sensing electrodes and the second sensing electrodes form a sensing layer. Therefore, the first sensing electrodes and the second sensing electrodes can be formed in a same forming layer with only a same photomask; and touch location detection and touch pressure detection can be performed by means of the first sensing electrodes and the second sensing electrodes respectively. In addition, the sensing layer may be an original forming layer in the panel, and an additional number of photomasks is not increased in a current IN-CELL process. Therefore, the present invention provides a panel, which not only implements touch location detection and touch pressure detection in an IN-CELL architecture, but also adds no additional photomasks in process, and has great practicability.

Although the present invention is disclosed through the foregoing embodiments; however, these embodiments are not intended to limit the present invention. Various changes and modifications made by a person of ordinary skill in the art without departing from the spirit and scope of the present invention shall fall within the protection scope of the present invention. The protection scope of the present invention is subject to the appended claims.

What is claimed is:
1. A panel, comprising:
 a plurality of first sensing electrodes, wherein at least one of the first sensing electrodes comprises a plurality of first openings, and wherein the first sensing electrodes comprise:

a plurality of central zone sensing electrodes, located in a central zone; and
a plurality of edge zone sensing electrodes, located in an edge zone, wherein at least one of the central zone sensing electrodes has a first area, at least one of the edge zone sensing electrodes has a second area, and a ratio of the first area to the second area is about 0.3 to 0.99; and
a plurality of second sensing electrodes, wherein the second sensing electrodes are located in the first openings, respectively, and the first sensing electrodes and the second sensing electrodes form a sensing layer of touch pressure and touch locations.

2. The panel according to claim 1, further comprising:
an active element array;
a plurality of pixel electrodes, electrically connected to the active element array; and
a reference electrode, wherein the sensing layer is located between the reference electrode and the active element array.

3. The panel according to claim 2, wherein the reference electrode comprises a plurality of second openings, which are respectively corresponding to and overlapping with the first openings.

4. The panel according to claim 2, wherein the reference electrode is a conductive adhesive formed on a color filter or a polarizer.

5. The panel according to claim 4, wherein the reference electrode is electrically connected to a direct current power supply or is grounded.

6. The panel according to claim 1,
wherein the edge zone substantially surrounds the central zone.

7. The panel according to claim 1, wherein the second sensing electrode are squares, rectangles, or rhombuses.

8. The panel according to claim 1, wherein the second sensing electrodes are N-gons, wherein N is a positive integer and a multiple of 4.

9. The panel according to claim 1, wherein peripheral contours of the first sensing electrodes are squares, rectangles, or L shapes.

10. The panel according to claim 1, further comprising a pressure sensing circuit, which is electrically connected to the first sensing electrodes.

11. The panel according to claim 10, further comprising a touch sensing circuit, which is electrically connected to the second sensing electrodes.

12. The panel according to claim 1, wherein said reference electrode further comprises an entity part, and said panel further comprises a plurality of visual auxiliary parts respectively located in the second openings and not contacting the at least one entity part.

13. A panel, comprising:
a plurality of first sensing electrodes, wherein at least one of the first sensing electrodes comprises a plurality of first openings;
a plurality of second sensing electrodes, wherein the second sensing electrodes are located in the first openings, respectively, and the first sensing electrodes and the second sensing electrodes form a sensing layer of touch pressure and touch locations;
an active element array;
a plurality of pixel electrodes, electrically connected to the active element array; and
a reference electrode, comprising:
an entity part;
a plurality of second openings respectively corresponding to and overlapping with the first openings; and
a plurality of visual auxiliary parts respectively located in the second openings and not contacting the at least one entity part, wherein the sensing layer is located between the reference electrode and the active element array.

14. The panel according to claim 13, wherein the reference electrode is a conductive adhesive formed on a color filter or a polarizer.

15. The panel according to claim 14, wherein the reference electrode is electrically connected to a direct current power supply or is grounded.

16. The panel according to claim 13, wherein the first sensing electrodes comprise:
a plurality of central zone sensing electrodes, located in a central zone; and
a plurality of edge zone sensing electrodes, located in an edge zone, wherein the edge zone substantially surrounds the central zone.

17. The panel according to claim 16, wherein at least one of the central zone sensing electrodes has a first area, and at least one of the edge zone sensing electrodes has a second area, and the first area is different from the second area.

18. The panel according to claim 17, wherein a ratio of the first area to the second area is about 0.3 to 0.99.

19. The panel according to claim 17, wherein a ratio of the second area to the first area is about 0.3 to 0.99.

20. The panel according to claim 13, wherein said visual auxiliary parts are electrically floating.

* * * * *